Dec. 28, 1954     I. HEIM     2,697,889

FILM IDENTIFYING SLIDE MOUNT

Filed April 19, 1954     2 Sheets-Sheet 1

INVENTOR
IRWIN HEIM
BY
ATTORNEY

Dec. 28, 1954     I. HEIM     2,697,889
FILM IDENTIFYING SLIDE MOUNT
Filed April 19, 1954     2 Sheets-Sheet 2
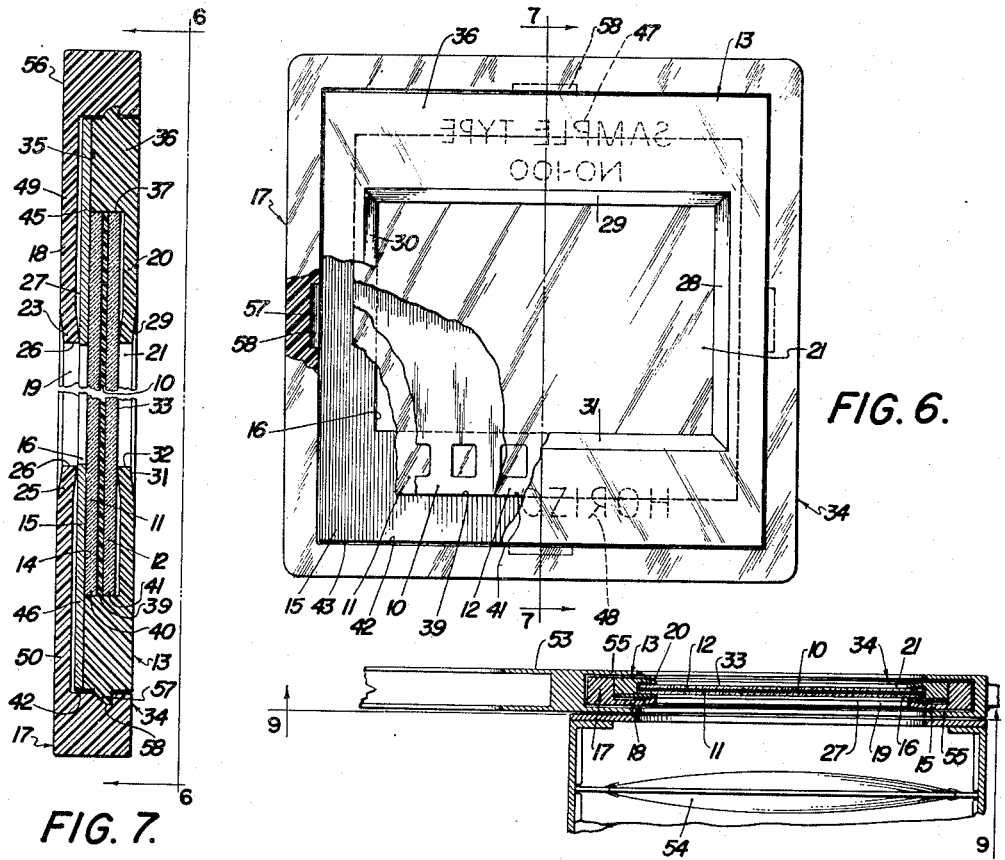
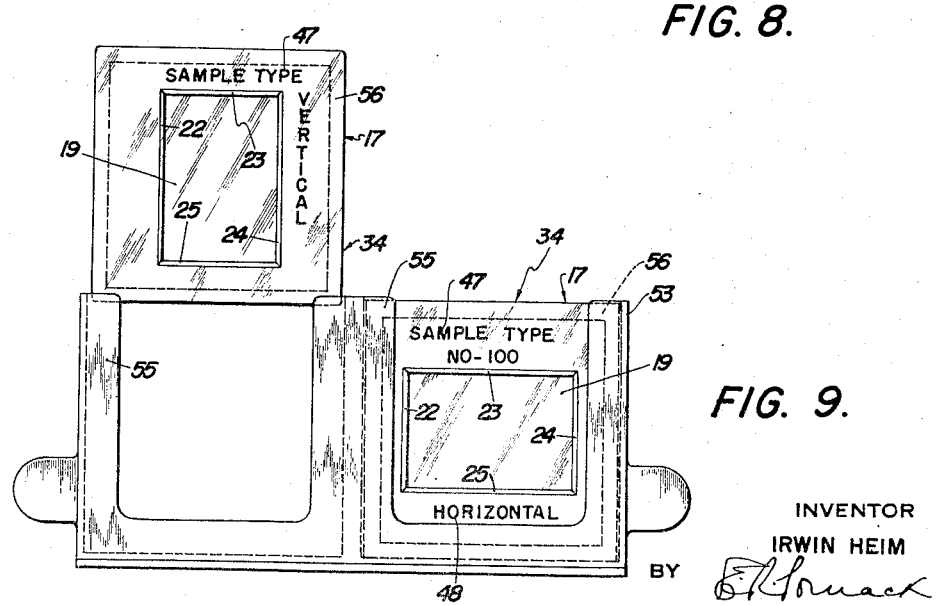
INVENTOR
IRWIN HEIM
BY
ATTORNEY

United States Patent Office 2,697,889
Patented Dec. 28, 1954

2,697,889

FILM IDENTIFYING SLIDE MOUNT

Irwin Heim, Valley Stream, N. Y.

Application April 19, 1954, Serial No. 424,024

1 Claim. (Cl. 40—152)

This invention relates to film identifying slide mounts—more particularly, although not exclusively, to film mounts of the category known as "recognition training slides" for use with projection apparatus in military training centers.

It is generally specified that a slide mount of the class above mentioned meet the following requirements: (1) it must maintain the film in flat condition within a predetermined plane, inasmuch as any deviation of the film from such plane, as through buckling, will result in distorted or out-of-focus images, because of the critical depth of focus of projection lenses; (2) it must permanently seal the film against exposure to the atmosphere; (3) it must protect the film against physical damage; (4) it must transmit light only through the exposed film area; (5) it must provide adequate area for film-identifying legends; and (6) it must be capable of mass production for a low unit cost.

It has been found that conventional slide mounts do not meet all these requirements. The most commonly employed mounts have a film and a contiguous apertured opaque mask flanked by two transparent glass plates, the plates being bound together at their edges by tape, or peripherally secured together by an internally recessed frame of opaque material. In mounts of such construction there is a space between the film and the glass plate in engagement with the mask, whereby the entire visible portion of the film is unsupported along the surface adjacent said space. Hence there is always the danger that the film will bend or buckle into said space, to produce an out-of-focus picture. This danger is increased in the said conventional devices which have a peripheral internally recessed frame supporting the marginal portions of the glass plates, particularly where the frames are made of plastic or other material having a different coefficient of expansion than glass. In the case of most plastics, for example, the coefficient of expansion is greater than that of glass; so that, under the influence of the heat from the projector, the frame expands to a greater degree than the glass plates. This results in a loosening of the grip of the frame upon the plates, with the danger of consequent shifting of the film within the mount. Such a shifting may also occur when, due to variations in production conditions of the glass plates or plastic frame, one or both of the plates are less than their required predetermined thickness, or the recess in the frame is greater than its proper predetermined size. With such conventional mounts there is thus the danger not only of a shifting of the film within its predetermined plane, but also of a buckling of the film into the adjacent space, due to the heat of the projector or the relative movements between the loosely held plates and the adjacent mask.

To meet the requirement that the mount keep out all light from the projector except at the central viewing film area, the peripheral frame, in such conventional devices, is generally made of opaque material, thereby obstructing the marginal portion of the mask and accordingly rendering such marginal portion useless as a legend-bearing area. In such devices the only region available for accommodating printed matter—constituting identification legends of the film—is the outer marginal surface of the frame. Since the frame is generally narrow, the available space for receiving an identifying legend is inadequate in many instances.

It is within the contemplation of my invention to provide a device having none of the aforementioned disadvantages. More specifically, the objects of this invention include the provision of a slide mount employing an arrangement of two transparent plates holding therebetween, in a sealed and protected position, a film adapted to be viewed through a projector—an opaque mask being provided with one or more relatively wide margins proportioned to receive thereon adequate printed film-identifying matter—the combination of film, plates and mask being held together, by yieldable means on a frame device, to prevent any displacement or buckling of the film—the frame being of transparent material to expose to view the said wide margins of the said mask. Moreover, in accordance with another object of my invention, light is transmitted only through the central film area of the mount when it is operatively disposed in a projector, no light passing through the marginal or frame portion of the device.

And it is my objective to provide a readily fabricated and easily assembled device having the features above mentioned.

Other objects, features and advantages will appear from the drawings and the description hereinafter given.

Referring to the drawings,

Figure 6 is a front elevational view of the components of Figure 1 in assembled relation, fragments being removed and sectioned for clarity, the view being taken looking in the direction 6—6 of Figure 7.

Figure 7 is an enlarged section of Figure 6 taken along line 7—7.

Figure 8 is a horizontal section taken through the assembled mount of Figure 6 shown operatively disposed within a slide holder a fragment of which is illustrated, the mount and holder being positioned on a projection machine a fragmentary rear portion of which with condenser lens is shown.

Figure 9 is a rear elevation of the mount holder of Figure 8 showing one slide mount operatively in place, and another slide mount in raised position, the view being substantially in the direction 9—9 of Figure 8.

Figure 1:
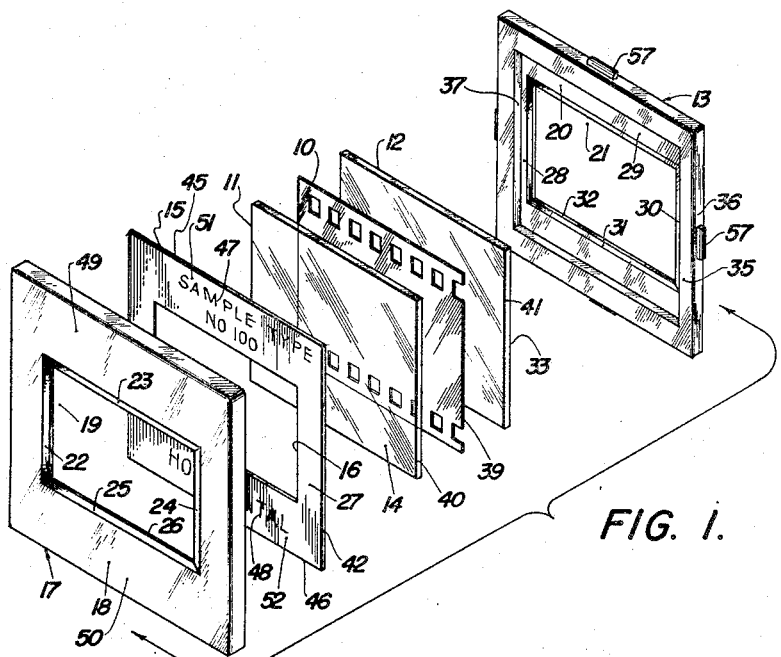
Figure 1 is an exploded perspective view showing the components of my invention in their proper sequential relation with respect to a film to be mounted therein.
Figure 2:
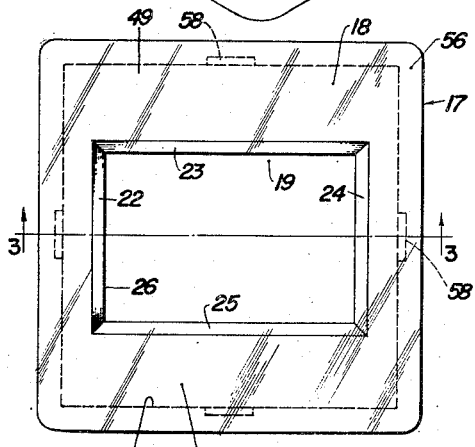
Figure 2 is a rear elevational view of the rear outer frame member.
Figure 4:
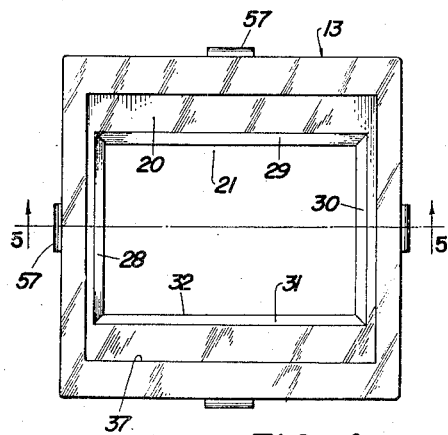
Figure 4 is a rear elevational view of the front inner frame member.
Figure 3:
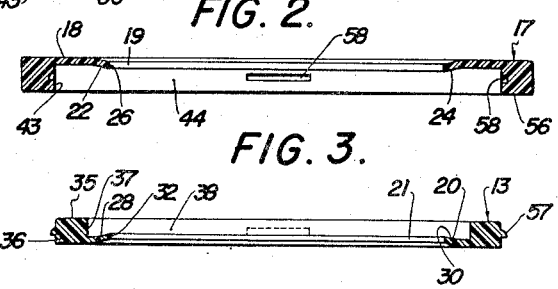
Figure 3 is a somewhat enlarged section of Figure 2 taken along line 3—3.
Figure 5:
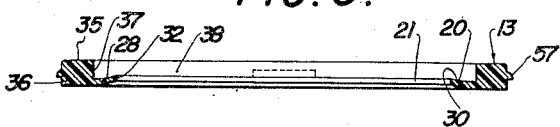
Figure 5 is a somewhat enlarged section of Figure 4 taken along line 5—5.

In the form of my invention illustrated, the film sheet 10 is positioned between the two flat transparent, preferably glass, plates 11 and 12—the assembly of film and plates being disposed within the inner frame member 13. Positioned against the rear surface 14 of the rear plate 11 is the flat opaque mask 15 having a central apertured portion 16. The assembly of inner frame member 13, mask 15, plates 11 and 12 and film 10 is positioned within the outer frame 17, in interlocking engagement with said inner frame as will more clearly hereinafter appear. The outer frame 17 has a rear wall 18 with a central apertured portion 19; and the inner frame 13 has a front wall with a central apertured portion 21—said apertured portions 19 and 21 being in registry with the apertured portion 16 of said opaque mask 15.

As shown in Fig. 6, the transparent outer frame member 17 forming the rear sides and front edge of the mount is recessed to receive the inner frame member 13; the outer edge of the inner frame member being substantially flush against the inner edge of the outer frame member. The inner frame member 13 is recessed to receive transparent plates 11 and 12 sandwiching the projection transparency 10, the member 13 with said plates serves further to position the mask 15 behind the rear plate at 14 in bearing relation against the outer frame member to permit easy assembly of the elements. Projection 57 serves as a locking means in a recess of the outer frame member.

In the preferred construction shown in the drawings, the marginal portions 22, 23, 24 and 25 of rear wall 18, defining the said apertured portion 19, are bent forwardly out of the plane of said rear wall 18, whereby the four edges 26 of said marginal portions are in engagement with the rear surface 27 of said mask 15. Similarly, the marginal portions 28, 29, 30 and 31 of front wall 20, defining said aperture 21, are bent rearwardly out of the plane of said front wall 20, whereby the four edges 32 of said last-mentioned marginal portions are in engagement with the front surface 33 of the front plate 12. In the practical application of this invention, the said respective rear and front walls 18 and 20 of the assembled frame unit (generally designated 34) are of thin somewhat resilient material, adapted to flex under pressure. The proportions of said frame unit 34, plates 11 and 12, and mask 15 are such that when said components are in operative assembled relation, as indicated in Figure 7, the said marginal portions 22, 23, 24 and 25 are in yieldable pressing engagement with said mask 15, and the said marginal portions 28, 29, 30 and 31 are in yieldable pressing engagement with front plate 12. The arrangement is hence such that the film 10 is at all times firmly held in flat condition, within a flat plane, by the two glass plates 11 and 12, under the yieldable pressing action of said marginal portions.

As shown in the drawings, mask 15 is disposed against the rear end surface 35 of the peripheral wall 36 of the inner frame 13. The depth of the said peripheral wall, from the front surface of inner frame wall 20 to said rear surface 35 thereof, is such that the rear surface 14 of rear plate 11 is flush with said surface 35 when the parts of the device are in assembled relation, so that the mask 15 is in engagement with and supported by the rear surfaces of both the inner frame 13 and the rear plate 11. The four inner surfaces 37 defining the lateral proportions of the internal cavity 38 of the inner frame 13 are in engagement with the respective peripheral edges 39, 40 and 41 of the film 10, and plates 11 and 12, thereby preventing any lateral shifting of the film. The peripheral edges 42 of the mask 15 are in abutment with the inner surfaces 43 defining the lateral proportions of the internal cavity 44 of the outer frame 17, to prevent a lateral shifting of the mask—and also to provide relatively wide marginal portions 45 and 46 presenting extended areas for film-identifying legends, such as those identified by the reference numerals 47 and 48.

In accordance with the preferred embodiment of this invention, the inner and outer frames 13 and 17, respectively, are made of transparent plastic material. Hence the said legends 47 and 48 are visible through the opposite wall portions 49 and 50, respectively, of the said rear wall 18. Since all of areas 51 and 52 of said marginal portions 45 and 46—from the aperture 16 to the outer edges 42 of the mask—are exposed to view through said transparent wall portions 49 and 50, adequate areas are provided for film-identification or other printed matter.

When the slide is operatively positioned in a slide holder 53 (see Figure 8) in front of a condenser lens 54, the light passing through said lens will be transmitted only through the central portion of the slide. In the form illustrated, the apertures 16, 19 and 21 are, as aforesaid, in registry; and the edges defining said apertures are similarly in substantial registry. Inasmuch as said mask 15 is opaque, and overlaps rear end surface 35 of the inner frame 13, it prevents the passage of light through the peripheral wall 36 of said inner frame, admitting light only through an area defined by the limits of said mask aperture 16. The opaque walls 55 of said slide holder 53 overlap the peripheral wall 56, and therefore also cooperate in the prevention of the transmission of light through the transparent peripheral wall 56 of the outer frame 17.

It will be observed that the peripheral wall 36 of the inner frame has four outwardly extending lugs 57, these being proportioned for entering the correspondingly positioned recessed portions 58 on the inner surfaces 43 of the outer frame 17. Peripheral walls 36 and 56 of the inner and outer frames 13 and 17, respectively, are thin and slightly resilient, enabling them to be deflected when the inner frame is operatively being forced into the outer frame, from the disassembled position of Figure 1 to the assembled position of Figure 8. When the lugs 57 reach the correspondingly positioned recessed portions 58, the lugs snap into said recessed portions, to effect an interlocking engagement of the inner and outer frames—with all the other components of the device firmly and immovably positioned in place.

Since the film 10 is tightly pressed within a flat plane between said plates 11 and 12, and engaged by said plates throughout the entire extent of said film, there is no danger of any buckling or shifting of the film. The yieldable clamping action of the marginal portions 22, 23, 24, 25 and 28, 29, 30 and 31 enables the pressure of the plates 11 and 12 upon the film to be maintained, even with different rates of expansion of the frame unit 34 and the glass plates 11 and 12. And the mask 15 is adapted to contain thereon adequate film-identification material, visible through the transparent frame—the mask also serving to screen out projector light through the peripheral portion of the slide.

In the above description, the invention has been disclosed merely by way of example and in preferred manner; but obviously many variations and modifications may be made therein. It is to be understood, therefore, that the invention is not limited to any specific form or manner of practicing the same, except insofar as such limitations are specified in the appended claim.

I claim:

In a recognition slide mount formed of a recessed outer frame member, an inner frame member seating in said outer frame member and a pair of transparent plates on opposite sides of a projection transparency constituting a film sandwich which is seated between said inner frame member and said outer frame member, that improvement comprising an apertured portion of said outer frame member adjacent the projection edge of the transparency and having edges bent inwardly of said mount to bear against and support the marginal portions of one of the plates of the sandwich, an apertured portion of said inner frame member having its edges bent inwardly of the mount, opposite the bent edges of the outer frame member aperture and bearing against the other of said plates to secure the sandwich in cooperation with said outer frame edge, within the frame in proper alignment for projection, said inner frame member being recessed to receive said film sandwich and to provide a flush surface of the outer plate of the sandwich substantially coextensive with the edge of said inner frame member when the sandwich is seated in the inner frame member, a flat mask sheet, apertured in registry with the inner and outer frame members interposed in flat unwrinkled condition and being pressed between the recess of the outer frame member and the coextensive outer plate surface of the sandwich and inner plate member, said flat mask sheet extending marginally from the inwardly bent outer and inner frame edges unobstructedly substantially to an edge of said recess in the outer frame member and said outer frame member being transparent to permit the viewing of recognition indicia and other markings on the exended marginal portion of said sheet mask which are concerned with the subject matter of the transparency.

References Cited in the file of this patent

UNITED STATES PATENTS

| Number | Name | Date |
|---|---|---|
| 809,574 | Metcalf | Jan. 9, 1906 |
| 2,505,250 | Kime et al. | Apr. 25, 1950 |
| 2,527,765 | Roehrl | Oct. 31, 1950 |
| 2,599,382 | Goldberg | June 3, 1952 |
| 2,603,017 | Merrill | July 15, 1952 |

FOREIGN PATENTS

| Number | Country | Date |
|---|---|---|
| 272,287 | Switzerland | Mar. 1, 1951 |